United States Patent [19]

Fuchs et al.

[11] 4,137,207
[45] Jan. 30, 1979

[54] PROCESS FOR THE PRODUCTION OF RESINS CONTAINING HYDROXYL GROUPS

[75] Inventors: Gundolf Fuchs, Buchholz; Dietrich Pirck, Reinbek, both of Fed. Rep. of Germany

[73] Assignee: Deutsche Texaco Aktiengesellschaft, Fed. Rep. of Germany

[21] Appl. No.: 625,391

[22] Filed: Oct. 24, 1975

Related U.S. Application Data

[63] Continuation-in-part of Ser. No. 412,235, Nov. 2, 1973, abandoned.

[51] Int. Cl.² .................. C08K 5/01; C08L 25/04; C08L 61/28; C08L 67/00
[52] U.S. Cl. .................. 260/29.6 T; 260/29.4 UA; 260/29.6 E; 260/32.6 R; 260/33.6 UA; 260/850; 260/855; 526/54; 526/55
[58] Field of Search ................ 260/33.6 UA, 32.6 R, 260/878 R, 876, 29.6 T, 29.2 UA, 850, 855, 29.40 A; 526/54, 55, 202, 203

[56] References Cited

U.S. PATENT DOCUMENTS

| 2,676,934 | 4/1954 | Butler | 260/28.5 |
|---|---|---|---|
| 3,306,954 | 2/1967 | Moore | 260/886 |
| 3,342,787 | 9/1967 | Muskrat | 260/78.5 |
| 3,374,209 | 3/1968 | Hay | 260/886 |
| 3,838,087 | 9/1974 | Pirck et al. | 526/202 |

FOREIGN PATENT DOCUMENTS 2147171 3/1973 France ................ 260/886

Primary Examiner—Allan Lieberman
Attorney, Agent, or Firm—Carl G. Ries; Thomas H. Whaley; Walter D. Hunter

[57] ABSTRACT

Synthetic resins suitable for use in the preparation of baking varnishes are prepared by copolymerizing a vinyl aromatic hydrocarbon, an ester of an alpha, beta-unsaturated monocarboxylic such as an acrylate and an alpha, beta-unsaturated, dicarboxylic acid, such as maleic acid, in solution or dispersion, the carboxyl groups of which being esterified with alcohols, etc. to yield a half-ester copolymer and reacted with alkylene oxides to a low residual acid number after which the solution or dispersion is adjusted with regard to acid number through the addition of phosphoric acid.

8 Claims, No Drawings

PROCESS FOR THE PRODUCTION OF RESINS CONTAINING HYDROXYL GROUPS

This application is a continuation-in-part of application Ser. No. 412,235, filed Nov. 2, 1973, now abandoned.

BACKGROUND OF THE INVENTION

The present invention relates to a process for the production of synthetic resins containing hydroxyl groups. In an another aspect, this invention relates to baking varnishes prepared by blending melamine with a solution of the synthetic resin containing hydroxyl groups.

Coatings produced by this method are known, the vehicles of which consist of (1) a polyester comprising hydroxyl and carboxyl groups and (2) an aminoplast, e.g., a melamine resin. Such polyesters are composed of different carboxylic acids and of different specific compounds with hydroxyl groups. The properties of the coatings can be conformed to the individual use by selecting the individual components forming the polyester and by the ratio of the components employed. Esterification conditions are chosen such that the reaction is as complete as possible, i.e., until the acid number of the formulation is less than 5 mg KOH/g. The vehicle dissolved in a suitable solvent, optionally after the addition of the usual adjuvants, is applied onto the substrate and then baked. With polyesters of a very low acid number, acidic substances, e.g., p-toluene sulfonic acid, may be added to the lacquer.

Other copolymers, suitable as lacquer resin components for baking varnishes and containing hydroxyl groups, are produced from alpha, beta-unsaturated mono and/or dicarboxylic acids, one or more vinyl aromatic compound(s) and an alkylene oxide. When the unsaturated acid is dicarboxylic acid, then one of its carboxyl groups has been esterified with a monovalent alcohol or with a monoglycol ether.

In this connection, reference is made to Applicant's German Patent Applications Ser. Nos. P 21 37 239.4 and P 21 65 491.1 and to U.S. Pat. No. 3,838,087. In German Patent Aplication Ser. No. P 21 37 239.4 it is disclosed that the copolymerization of unsaturated dicarboxylic acid anhydride and a vinyl aromatic hydrocarbon in dispersion may be performed in the presence of a particular dispersant, thereby obtaining a product having a suitable K value. The K value is defined as a measure of the polymer chain length and is described in detail by K. Fikentscher in "Cellulosechemie", 13, 58 (1932). By performing all three process stages-copolymerization, halfesterification, and alkoxylation — in the presence of a dispersant and in an extensively aromatic-free high-boiling hydrocarbon as reaction medium as more fully described in German Patent Application Ser. No. P 21 65 491.1, the suspension condition is maintained through all three process stages and the lacquer resin is obtained as a dispersion.

The hydroxyl copolymers of this invention, are, when used for baking varnishes, admixed in solution or dispersion with a melamine resin which serves as a crosslinking agent, and applied, after the addition of pigments, onto a substrate and baked at temperatures ranging from about 180 to about 220° C.

The resulting lacquer films are, with respect to their mechanical properties and their resistance to chemical reagents, fully satisfactory although the field of application is restricted due to the high baking temperature.

Thus, the present invention, in one aspect is related to a process for the production of baking varnishes wherein the solution of a synthetic resin containing hydroxyl groups of this invention is blended with melamine resin as a crosslinking agent in a weight ratio of the hydroxyl copolymerizate to the melamine resin ranging from about 90:10 to about 70:30, and optionally, adjuvants, pigments, and an acid and characterized by employing as the synthetic resin containing hydroxyl groups, a copolymer of a vinyl aromatic hydrocarbon an ester of an alpha, beta-unsaturated monocarboxylic acid and an alpha, beta-unsaturated dicarboxylic acid in solution or dispersion, the carboxyl groups of which being extensively esterified with alcohols and/or glycolmonoethers, and reacted with alkylene oxides until the residual acid number of said hydroxyl copolymer reaches the value of from about 0 to 2 mg KOH/g of substance, based on a 50 percent solution or suspension, said solution or suspension then being adjusted to an acid number of at least 5 by adding phosphoric acid thereto after which the thus-formed varnish may be applied and baked, subsequent to admixing melamine, and optionally with pigments and adjuvants.

In preparing the novel copolymers of this invention preferably the polymerization reaction is conducted in the presence of a dispersing agent such as an ester of alpha beta-unsaturated dicarboxylic acid with an aliphatic alcohol of from 10 to 20 carbon atoms, etc. as exemplified by an isobutylene-maleic acid half-ester copolymer with a mixture of straight chain $C_{12}$ to $C_{18}$ alcohols as the alcohol component, etc. and in the presence of an aromatic hydrocarbon solvent boiling in the range of about 150 to about 190° C. If desired, a portion (i.e., from about 10 to about 15 percent by weight) of the aromatic hydrocarbon solvent may be replaced by a kerosene cut boiling in the same range. The copolymerization reaction is conveniently carried out at temperatures ranging from about 60° to about 170° C. Preferably, the copolymerization is conducted in the presence of a free radical type catalyst such as an organic peroxide as exemplified by benzoyl peroxide, tertiary butyl hydroperoxide, methyl ethyl ketone peroxide, cumene hydroperoxide, etc.

After the initially formed copolymer of the vinyl aromatic compound, ester of the alpha, beta-monocarboxylic acid and the alpha, beta-dicarboxylic acid has been esterified with alcohols and/or glycol monoethers to yield the half-ester copolymer, an alkylene oxide or mixture of alkylene oxides is reacted at a temperature of about 60° to about 100° C utilizing a mole ratio of the alkylene oxide to the half-ester copolymer of about 0.1:1 to 1:1 or more.

In a preferred embodiment of the present invention, the residual acid number of the hydroxyl copolymer is reduced to a value of from 0.5 to 1. The addition of an aqueous solution of monomethyl or dimethyl formamide or of monoethyl or diethyl formamide, respectively, to said solution or dispersion of said half ester copolymer, prior to the reaction of alkylene oxide, improves the storage stability of the lacquer considerably. The amount of the dialkyl formamide added will range from about 0.15 to about 0.3 mole per mole of hydroxyl copolymerizate prior to reaction with the alkylene oxide. While the production of the said hydroxyl copolymer can be achieved by reacting the respective half-ester copolymer with different catalysts, monomethyl and dimethyl formamides and monoethyl and diethyl formamides proved to be advantageous as these improve the stability of viscosity of the final formulation of the lacquer (mixture of hydroxyl and melamine resins). The stability of viscosity is determined by an accelerated ageing test, i.e., the increase in the viscosity of a lacquer solution is measured while storing it for 21 days at a temperature of 50° C. To be acceptable the final viscosity value exhibited by the lacquer after this test must be no more than twice the initial viscosity value. The subject storage stability test is equivalent to maintaining the product for at least six months at room temperature.

Surprisingly, the undesired crosslinking reaction of the product while being stored did not take place with the products of the invention, although the addition of the activating acid would favor the same. It is especially desirable to employ a hydroxyl copolymer produced from a vinyl aromatic hydrocarbon, a small amount of an ester of an alpha, beta-unsaturated monocarboxylic acid such as an acrylate or methacrylate having from 4 to about 16 carbon atoms, and a half ester of an alpha, beta-unsaturated dicarboxylic acid, the residual carboxyl groups of which being extensively alkoxylated. Useful acrylates and methacrylates utilized as alpha, beta-unsaturated monocarboxylic acid esters include, for example, ethyl, isopropyl, butyl, hexyl, heptyl, ethylhexyl acrylates, etc. These acrylates are employed in an amount of from 10 to 20 mole percent, based on the amount vinyl aromatic hydrocarbon, as a replacement for a portion of the said vinyl aromatic hydrocarbon. This amount corresponds to about from 5 to 10 weight percent, based on the anhydride copolymer, and from 3.5 to 7.0 weight percent based on solid resin.

Vinyl aromatic hydrocarbons, suitable for the production of hydroxyl copolymers of this invention are those with 8 to about 12 carbon atoms as exemplified by styrene, alkyl styrenes, alpha-methyl styrene, vinyl toluenes, and vinyl xylenes. Examples for alpha, beta-unsaturated dicarboxylic acid include maleic acid, fumaric acid, and citraconic acid, etc. Instead of maleic acid, one way employ maleic acid anhydride, if desired.

Alcohols suitable for esterification with the said dicarboxylic acids are the straight-chain and branched-chain monohydric alcohols having from 1 to 8 carbon atoms such as methyl, ethyl, isopropyl, butyl, isobutyl, hexyl and isooctyl alcohol, etc. Alkoxylation is performed with ethylene, propylene, or butylene oxide in this invention.

Glycol monoethers suitable for esterification of the said dicarboxylic acids include compounds of the formula:

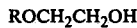

where R is straight or branched chain alkyl of from 1 to 6 carbon atoms as exemplified by ethylene glycol monomethyl ether, ethylene glycol monoethyl ether, ethylene glycol monoisopropyl ether, ethylene glycol monohexyl ether, etc.

The esterification of the carboxyl groups of the initially formed copolymer with alcohols or glycol monoethers to form the half-ester copolymer is conducted at a temperature of about 140 to about 180° C utilizing a mole ratio of said alcohol or glycol monoether to said initial alpha, beta-unsaturated dicarboxylic acid or to said anhydride thereof, from about 1:1 to about 1.3:.

With the aforementioned prior art, it was not predictable that a vehicle for baking varnishes which could be baked at a low temperature, would be obtained simply by continuing the said alkoxylation until the acid number of the mixture was reduced to a value of from about 0 to 2 mg KOH/g of substance, based on a 50 percent solution, and then by adjusting the said acid number to at least 5 by adding phosphoric acid without the stability of viscosity being notably reduced therewith. This step of increasing the acid number by the addition of phosphoric acid is called hereinafter "acid final curing".

It is surprising that by this action a lacquer resin component is obtained which, after the addition of melamine resin as crosslinking agent, can be baked to a lacquer resin at temperatures of as low as 130° C or even lower within the usual time, whereby the resulting lacquer resin exhibits elasticity, hardness and a resistance to chemical reagents of minimum values which lie above those required in technical applications. The lacquer resins known in the art, when baked at temperatures as low as the temperatures set forth above, yield, lacquers which possess elasticity or hardness values which are below the required minimum, with the exception of acrylate resins which are considerably more expensive. It has been found that the "acid final curing" with phosphoric acid leads to the favorable combination of properties-low baking temperature with simultaneously good elasticity, hardness, and resistance to chemical reagents.

In preparing the novel copolymer resins of this invention, the mole ration of the reactants that is of the vinyl aromatic compound to the ester of the alpha, beta-unsaturated monocarboxylic acid to the alpha, beta-unsaturated dicarboxylic acid may be varied between 30:20:50 to 40:10:50.

As previously pointed out the polymerization process employed in preparing the synthetic resins of this invention may be conducted in solution or dispersion and when the process is carried out in the presence of a dispersing agent, such as an isobutylene-maleic acid half-ester copolymer with a mixture of $C_{12}$ to $C_{18}$ alcohols as the alcohol component, from about 0.5 to 2.5 weight percent of the dispersing agent based on the total weight of the vinyl aromatic hydrocarbon, the alpha, beta-monocarboxylic acid ester and the alpha, beta-dicarboxylic acid is utilized in preparing the initially formed copolymer.

The employment of a copolymer in which from 10 to 20 percent of the vinyl component is replaced by an acrylate; for example, butyl acrylate, surprisingly improves the bending elasticity of the lacquer films (illustrated by Example I and II below). The improvement of the lacquer properties, especially the bending elasticity by adding acrylate, however, takes place only in conjunction with the "acid final curing". Example III illustrates that the acid number should be permitted to fall below 3 as otherwise the bending elasticity is notably reduced.

The following examples which illustrate the invention in more detail are to be considered not limitative. The test values of the lacquer films obtained from the individual examples are summarized in Table 1.

COMPARATIVE EXAMPLE A (Example 4 of German Patent Application No. P 21 37 239.4, abovementioned)

STAGE 1

A stirring vessel having an operating pressure of at least 5 atmospheres was precharged with 213 kilograms of an aromatic mixture boiling in the range of from 150 to 175° C and 2.02 kilograms of a solid dispersant consisting of an isobutylene-maleic acid half ester copolymer with a mixture of straight-chain $C_{12}$ to $C_{18}$ alcohol as the alcohol component. This mixture was heated to a temperature of 150° C and the following material were added at a constant rate over a period of one hour:
 104 kilograms styrene, and
 98 kilograms maleic acid anhydride
 2.02 kilograms benzoyl peroxide
A coagulate-free polymer suspension of low viscosity was formed which, after the addition of monomers was stopped, was maintained at the temperature of 150° C. for two hours more. The K value of the copolymer was determined and found to be 18.

STAGE 2

Over a period of one hour, a mixture of:
 224 kilograms 2-butoxyethanol, and
 0.8 kilograms phosphoric acid
was added to the heated suspension previously obtained.

During this partial esterification reaction, which was conducted over a period of three hours the suspended solid polymer turned slowly into a practically clear resin solution. From 2 to 3 kilograms of reaction water were distilled from the reaction mixture during the esterification reaction.

STAGE 3

The reaction product obtained from Stage 2 was cooled to a temperature of 75° C. and admixed with 26.6 kilograms of a 50 percent aqueous dimethyl formamide solution after which 88 kilograms of ethylene oxide was added to the solution within 30 minutes while maintaining the reaction temperature in the range of from 75 to 85° C. The ethoxylation time was 5.5 hours. Subsequently, the ethylene oxide surplus was removed by allowing the mixture to stand at reaction temperature and finally by applying vacuum. (1.42 psig).

The thus obtained hydroxyl resin, amounting to about 460 kilograms, which was subsequently subjected to the test methods common in resin chemistry, had the following properties:
 Solid content: about 50 percent
 Viscosity: 900 cp at 50° C.
 Acid number: 5
 Iodine color number: from 3 to 4
The said was blended with melamine resin (Maprenal RT) in the ratio of 85:15, to formulate a baking varnish.

COMPARATIVE EXAMPLE B (Example 5 of German Patent Application P 21 37 239.4, mentioned above)

The process according to Comparative Example A was repeated, but the ethoxylation was stopped after 4 hours. The product had the following properties:
 Solid content: about 49 percent
 Viscosity: 950 cp at 50° C.
 Acid number: 20.7
 Iodine color number: from 2 to 3
The technical values of this resin were tested in mixture with melamine resin (Maprenal RT) and without the addition of melamine resin under different baking conditions as follows:
 a. without melamine resin at 180° C during 30 minutes
 b. with 10% melamine resin at 180° during 30 minutes
 c. with 10% melamine resin at 130° C. during 30 minutes
 d. with 30% melamine resin at 130° C during 30 minutes

EXAMPLE I

The procedure of comparative Example A was repeated except that the copolymer employed was one in which 20 mole percent of the styrene was replaced by butyl acrylate. However, in Stage 3 the ethoxylation was continued until the residual acid number of the solution had dropped to about 1 which was the case after an additional reaction time of 1 ½ hours. Thereafter, the acid number of the said resin solution was again increased to a value of 9, prior to admixing melamine resin and pigment, by adding a solution of phosphoric acid in an alcohol (other organic solvents may be used to form the phosphoric acid solution, if desired). The resin solution had the following properties:
 Solid content: about 50 weight percent
 Viscosity: 800 cp at 50° C
 Acid number: 18, based on solid resin
 Iodine color number: 3

EXAMPLE II

In this example the procedure of Example I was followed but instead of the pure aromatic mixture liquid medium used in Comparative Example A, a mixture of 88 percent of the said mixture and 12 percent of a kerosene cut boiling in the same range of the aromatic mixture was employed, and instead of 20 percent, only 10 percent of the styrene was replaced by butyl acrylate.

EXAMPLE III

The procedure of Example I was followed here with the difference that the acid number of the said 50 percent solution was adjusted to a value of 5.1.

TABLE 1

| | TEST DATA FOR WHITE LACQUERS WITH A RESIN TO PIGMENT RATIO OF 1:0.75 | | | | | | | | Resistance to Chemical reagents | | | | |
|---|---|---|---|---|---|---|---|---|---|---|---|---|---|
| Example + Test | Hydroxy resin: Melamine ratio | Acid Number[1] residual | +$H_3PO_4$ | Baking Conditions Min. | ° C | Elasticity Erichsen Deepening | Cross-cut adhesion (Gitterschnitt) | Premium Gasoline | Alcohol; Aromatics of 1:2 | Hardness (3) | Gloss (4) | Mandrel bending test (5) |
| A | 85:15 | 2,5 | | 30 | 180 | 5,8 | 1 | +(2) | φ (2) | 126 | 88 | 16 |
| B(a) | 100:0 | 10 | | 30 | 180 | 7,0 | 1 | + | 0 | 134 | 97 | 20 |
| (b) | 90:10 | 10 | | 30 | 180 | 4,7 | 1 | + | + | 148 | 92 | 25 |
| (c) | 90:10 | 10 | | 30 | 130 | 6,5 | 1–2 | φ | 0 | 124 | 98 | 16 |
| (d) | 70:30 | 10 | | 30 | 130 | 0,6 | 4 | + | + | 152 | 96 | >32 |
| I | 75:25 | 1,2 | 9 | 30 | 130 | 6,4 | 1 | (+) | φ | 125 | 106 | <2 |

TABLE 1-continued
TEST DATA FOR WHITE LACQUERS WITH A RESIN TO PIGMENT RATIO OF 1:0.75

| Example + Test | Hydroxy resin: Melamine ratio | Acid Number[1] residual | +$H_3PO_4$ | Baking Conditions Min. | °C | Elasticity Erichsen Deepening | Cross-cut adhesion (Gitter- schnitt) | Resistance to Chemical reagents Premium Gasoline | Resistance to Chemical reagents Alcohol; Aromatics of 1:2 | Hardness (3) | Gloss (4) | Mandrel bending test (5) |
|---|---|---|---|---|---|---|---|---|---|---|---|---|
| II | 75:25 | 0,85 | 8,5 | 30 | 130 | 6,0 | 2 | + | (+) | 126 | 104 | 3 |
| III | 75:25 | 0,34 | 5,1 | 30 | 130 | 5,7 | 1 | (+) | φ | 123 | 106 | 16 |

(1) The values are based on a 50 percent solution. The residual acid number is the carboxylic acid number remaining after alkoxylation. The acid number mentioned under (+$H_3PO_4$) is the total number after the addition of $H_3PO_4$.
(2) Symbols: + completely stable; (+) almost completely stable; φ slightly swollen; 0 swollen; — dissolved.
(3) Pendulum hardness values according to Koenig (DIN-53157).
(4) Gloss according to Lange at 45° reflection
(5) Mandrel bending test according to procedure DIN -53152.

Table 1 clearly illustrates the superiority of the quality of lacquer coatings of this invention when compared under equal baking conditions with known coatings (30 minutes at 130° C) (compare Example B (c) and (d) with Example I).

The properties of the films formed from the products of this invention are comparable to films formed from known products which were baked for 30 minutes at 180° C., and are, with respect to the Mandrel bending test, even superior to such films. This is shown in Table 1 by comparing the properties of the films of Example A, B (a) and (b) with those of Example I.

What is claimed is:

1. A synthetic resin containing hydroxyl groups suitable for use in preparing baking varnishes which comprises a copolymer of a vinyl aromatic hydrocarbon of from 8 to 12 carbon atoms, an ester of an alpha, beta-unsaturated monocarboxylic acid and an alpha, beta-unsaturated dicarboxylic acid in solution or dispersion, the said copolymer having been prepared in the presence of an ester of an alpha, beta-unsaturated dicarboxylic acid with an aliphatic alcohol of from 10 to 20 carbon atoms as a dispersing agent, the carboxyl groups of the said copolymer being esterified with an alcohol having from 1 to 8 carbon atoms or a glycol monoether of the formula:

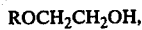

ROCH$_2$CH$_2$OH, wherein R is straight or branched chain alkyl of from 1 to 6 carbon atoms, to yield a half-ester copolymer and then reacted with an alkylene oxide having from 2 to 4 carbon atoms until the residual acid number of the said hydroxyl copolymer is reduced to a value of from about 0 to 2 mg KOH/g of the copolymer, based on a 50 weight percent solution or suspension and finally adjusting the acid number of the said solution or said dispersion to at least 5 by adding phosphoric acid thereto, the mole ratio of the vinyl aromatic hydrocarbon to the ester of the alpha, beta-unsaturated monocarboxylic acid to the alpha, beta-unsaturated dicarboxylic acid or anhydride thereof being between 30:20:50 and 40:10:50; wherein the said half-ester copolymer is reacted with the said alkylene oxide at a temperature between about 60 and about 100° C utilizing a mole ratio of alkylene oxide to the half-ester copolymer of between about 0.1:1 to 1.1.

2. The synthetic resin of claim 1 wherein the said copolymer is esterified at a temperature between about 140 and about 180° C utilizing a mole ratio of said alcohol or glycol monoether to said alpha, beta-unsaturated dicarboxylic acid or anhydride thereof of from about 1:1 to about 1.3 to 1.

3. The synthetic resin of claim 1 wherein the said copolymer is in dispersion in the presence of a hydrocarbon solvent mixture of 85 to 90 percent by weight of an aromatic hydrocarbon solvent boiling in the range of about 150 to about 190° C with the balance of the mixture being a kerosene cut of the same boiling range and between about 0.5 and 2.5 weight percent of the dispersing agent based on the combined weight of the said vinyl aromatic hydrocarbon, the said ester of the alpha, beta-unsaturated monocarboxylic acid and said alpha, beta-unsaturated dicarboxylic acid or anhydride thereof.

4. The synthetic resin of claim 1 wherein the residual acid number of the hydroxyl copolymer is reduced to a value of 0.5 to 1.0.

5. The synthetic resin of claim 1 wherein prior to the reaction with the alkylene oxide an aqueous solution of material selected from the group consisting of monomethyl formamide, dimethyl formamide, monoethyl formamide, and diethyl formamide is added to the said solution or dispersion of the said half-ester copolymer and wherein the amount of the said formamide will range from about 0.15 to about 0.3 mole per mole of the said half-ester copolymer.

6. The synthetic resin of claim 1 wherein the said alpha, beta-unsaturated monocarboxylic acid is acrylic acid.

7. The synthetic resin of claim 1 wherein the said ester of the alpha, beta-unsaturated monocarboxylic acid is an ester of acrylic acid with a compound selected from the group consisting of ethanol, butanol, and ethyl hexanol.

8. A baking varnish consisting essentially of a solution of the synthetic resin containing hydroxyl groups of claim 1 in a solvent selected from the group consisting of an aromatic hydrocarbon solvent boiling in the range of about 150 to 190° C and a mixture of about 10 to about 15 percent by weight of kerosene boiling in the range of about 150 to about 190° C and with the balance being an aromatic hydrocarbon solvent boiling in the same range; blended with melamine resin, and wherein the weight percent ratio of the said synthetic resin to the melamine resin is from about 90:10 to about 70:30.

* * * * *